United States Patent
Biesenbach

(10) Patent No.: US 9,073,144 B2
(45) Date of Patent: Jul. 7, 2015

(54) METHOD FOR JOINING TWO BARS END-ON BY MEANS OF ELECTRON BEAM WELDING

(75) Inventor: Martin Biesenbach, Düsseldorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 295 days.

(21) Appl. No.: 13/821,286

(22) PCT Filed: Sep. 9, 2011

(86) PCT No.: PCT/EP2011/065599
§ 371 (c)(1),
(2), (4) Date: Mar. 7, 2013

(87) PCT Pub. No.: WO2012/032138
PCT Pub. Date: Mar. 15, 2012

(65) Prior Publication Data
US 2013/0168368 A1    Jul. 4, 2013

(30) Foreign Application Priority Data
Sep. 9, 2010 (DE) .......................... 10 2010 040 502

(51) Int. Cl.
*B23K 15/00* (2006.01)
*B23K 37/053* (2006.01)
*F01D 5/06* (2006.01)

(52) U.S. Cl.
CPC ........... *B23K 15/0046* (2013.01); *B23K 37/053* (2013.01); *B23K 15/006* (2013.01); *B23K 37/0533* (2013.01); *B23K 2201/001* (2013.01); *B23K 2201/06* (2013.01); *F01D 5/063* (2013.01); *F05D 2230/233* (2013.01); *F05D 2240/60* (2013.01)

(58) Field of Classification Search
CPC .. B23K 15/00; B23K 15/0046; B23K 37/053; F01D 5/06
USPC ......... 219/121.14, 121.35; 228/191, 212, 213
See application file for complete search history.

(56) References Cited

U.S. PATENT DOCUMENTS

| | | | |
|---|---|---|---|
| 3,401,253 A | * | 9/1968 | Foster ...................... 219/121.14 |
| 3,794,807 A | | 2/1974 | Bailey |
| 4,063,062 A | | 12/1977 | Kuhnen |
| 4,086,690 A | | 5/1978 | Bernasconi |
| 5,085,363 A | * | 2/1992 | Sims ............................ 228/119 |

FOREIGN PATENT DOCUMENTS

| | | |
|---|---|---|
| CN | 1974103 A | 6/2007 |
| CN | 101444871 A | 6/2009 |
| JP | 2127986 A | 5/1990 |

(Continued)

*Primary Examiner* — Samuel M Heinrich

(57) ABSTRACT

A method for joining a first bar end-on to a second bar by means of electron beam welding at a welding point is provided. The method includes the following steps, aligning the two bars with each other along a longitudinal axis, applying a sleeve, which surrounds the welding point in the circumferential direction with respect to the longitudinal axis, welding at the welding point by means of electron beam welding, wherein an electron beam welding apparatus is made to pass along an advancing direction, along in relation to a surface of the sleeve and along the welding point, and removing the sleeve.

9 Claims, 2 Drawing Sheets

(56) References Cited

FOREIGN PATENT DOCUMENTS

| JP | 0386384 | 4/1991 |
| JP | 106036 | 1/1998 |
| JP | 10006036 A | 1/1998 |
| JP | 2006142340 A | 6/2006 |

* cited by examiner

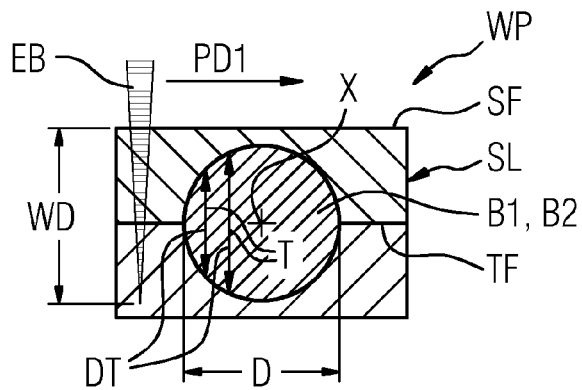
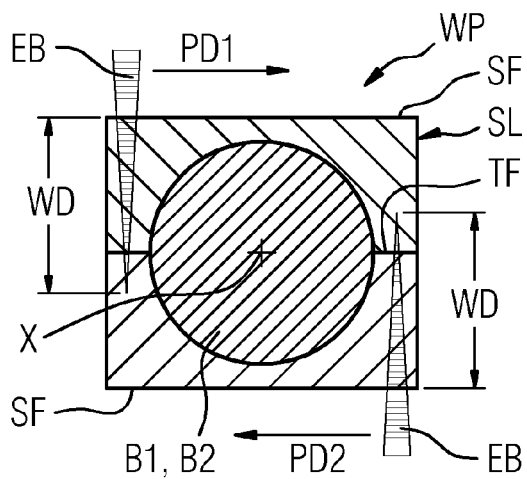
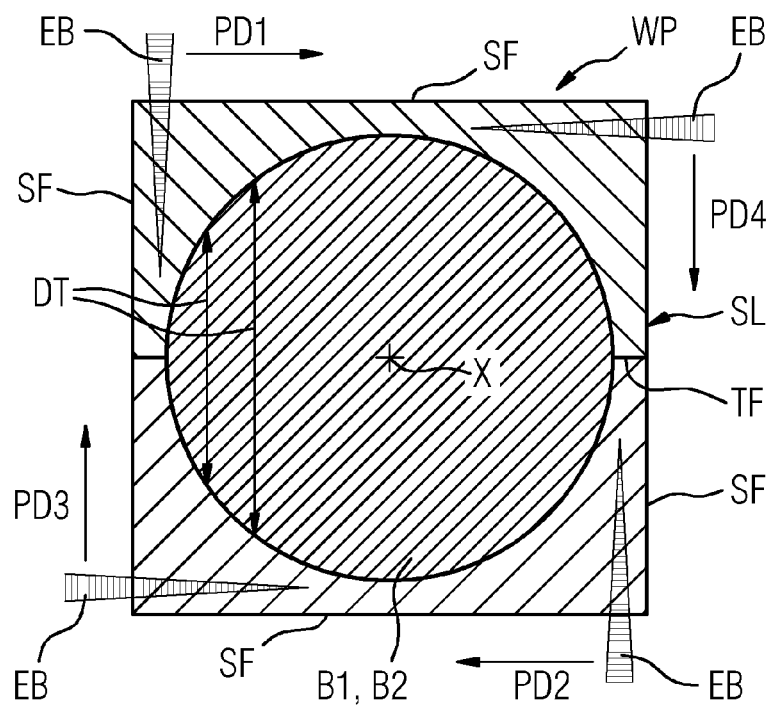

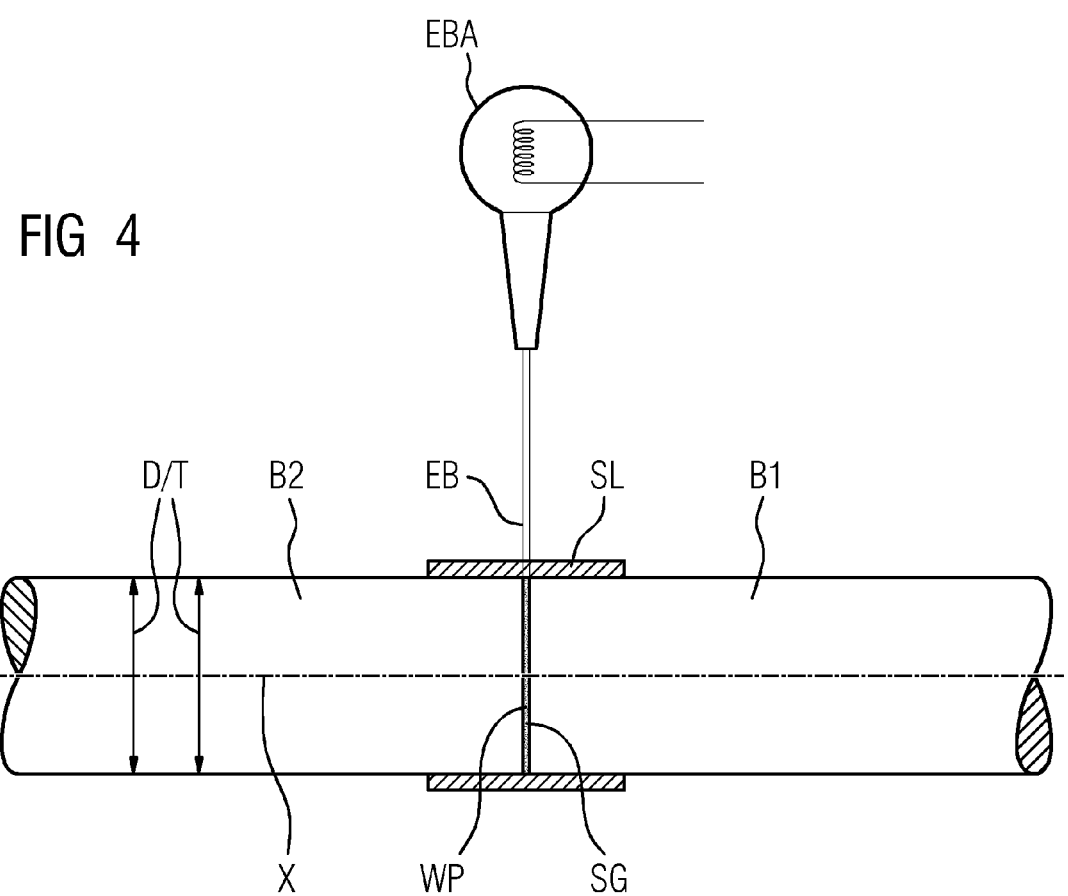

METHOD FOR JOINING TWO BARS END-ON BY MEANS OF ELECTRON BEAM WELDING

CROSS REFERENCE TO RELATED APPLICATIONS

This application is the US National Stage of International Application No. PCT/EP2011/065599, filed Sep. 9, 2011 and claims the benefit thereof. The International Application claims the benefits of German application No. 102010040502.7 DE filed Sep. 12, 2002. All of the applications are incorporated by reference herein in their entirety.

FIELD OF INVENTION

The invention relates to a method for joining a first bar end-on to a second bar by means of electron beam welding.

BACKGROUND OF INVENTION

Particularly in the production of shafts for turbomachines, for example turbo-compressors, steam turbines or gas turbines, shaft parts are often butt welded to one another end-on by bringing the two bar parts placed against one another into a melt in the region of the abutting ends by means of an electron beam passing into the join by means of an electron beam welding apparatus without further filler, which after cooling results in a joint. The main difficulty in relation to a radial seam welded by electron beam in the case of a shaft or any other bar material consists in the production of the flawless seam start and of the seam end. The seam start is to be understood as the region in which the electron beam is introduced and the seam end is to be understood as the region in which the electron beam is removed from the material. Further disturbances to the homogeneity of the material microstructure arise as a result of any instances of overwelding of the already welded weld seam in the event that regions of action of the electron beam overlap in the material during different welding operations. Additional difficulties arise given small shaft diameters or small bar thicknesses as a result of the accumulation of heat in the region of the center of the component, as a result of which flawless welding is not possible in the region of overlap and in the region of removal of the welded joint.

Even the most complicated modern electron beam control systems are unable to prevent the welding defects described completely.

SUMMARY OF INVENTION

Proceeding from the described problems and disadvantages of the prior art, the invention addressed the problem of improving the quality of the welding described in the introduction without additionally making it more complicated to control the electron beam.

U.S. Pat. No. 4,063,062 describes a conventional electronic beam welding of round shaft portions to one another end-on, wherein a region of introduction and a region of removal disturb the homogeneity of the weld.

To solve this problem, the invention proposes a method of the type defined in the introduction having the additional features of the characterizing part of the main claim. The dependent claims which refer back thereto contain advantageous developments of the invention.

The envelopment according to the invention of a joining zone of the two abutting ends of the bars to be joined by means of a sleeve makes it possible to arrange the region in which the electron beam is introduced and the region in which it is removed outside the material which is actually to be joined. Accordingly, there is a completely homogeneous material structure in the joining zone of the parts which are actually to be joined. The method according to the invention additionally differs from the prior art in that it is not actually the case, as originally desired, that only two components are joined to one another, but rather that three components are joined to one another by the electron beam welding.

The sleeve expediently has an inner contour which is matched to the outer contour of the bars in the region of the welding point. In order to prevent an effect similar to the introduction or the removal of the material transition from the sleeve on the two abutting ends of the bars, the production of a fit on the sleeve relative to the two bar ends is expediently in the accuracy range of +/−0.1 mm, with respect to the diameter. Furthermore, it is expedient if the sleeve has a part join, which is arranged in such a manner that the sleeve can be placed around the profiles of the bars. Given a circular cross section, this is the case for example if the two parts of the sleeve each have a semicircle as a recess in the cross section. The two-part or multi-part sleeve is held together either mechanically, by tack welds or by welded-on brackets. In the interest of simple handling, the sleeve can have a rectangular outer cross section. The rectangular outer cross section additionally has the advantage that, given a progress direction of the electron beam apparatus parallel to the surface of the sleeve, assuming that the penetration depth of the electron beam is constant, a homogeneous material microstructure arises at the welding point. It is expedient that the sleeve consists of the same material in the region of the joining zone as the two bars to be joined to one another at least in the region of the welding, such that any possible material transition between the three parts involved results in a homogeneous material microstructure in the region of the joining zone or welding point. In this way, it is possible for any possible lack of material in the joining zone—for example as a result of a minimally remaining axial gap in the region of the two bar ends which are to be joined to one another—to be compensated for by the material of the sleeve which is then available as filler.

It is preferable for the sleeve to be removed by cutting, in the case of the shaft simply by overturning the welding point.

In the case of shaft diameters or thickness profiles along a progress direction of the welding apparatus which are smaller than the maximum weld penetration depth of the electron beam, the electron beam can be guided over the shaft cross section or bar cross section by a simple electron beam control system from left to right or conversely along the welding point. In this way, the end of the electron beam always remains in the sleeve material if the sleeve material is provided with a correspondingly adequately thick form in the direction of the penetration depth of the electron beam. According to the invention, the region of introduction and the region of removal can be chosen to be very short, since the welding defects which occur here are machined off after the welding. Accordingly, the electron beam can be controlled in the sleeve material regardless of welding defects. An additional advantage arises in the case of small shaft diameters which are smaller than the maximum weld penetration depth of the electron beam, in that small welding defects in the bottom of the weld seam, so-called spikes, are unavoidably present merely in the sleeve material, and are likewise removed mechanically from the bar or the shaft during finishing.

If the shaft diameter becomes greater than the maximum weld penetration depth, it is possible, up to a shaft radius which corresponds approximately to the maximum weld penetration depth of the electron beam, for the joint welding to be carried out by welding from two sides. These two sides preferably lie directly opposite one another, such that there is at least a minimal overlap between the penetration tip of the electron beam or the weld penetration depth during the welding from the first side along a first progress direction and the penetration depth or the weld penetration depth during the welding along a second progress direction.

In the case of even larger shaft diameters in which the shaft radius exceeds the maximum weld penetration depth which can be achieved with the electron beam apparatus, it can be expedient if the electron beam penetrates into the workpiece not only from two opposing sides during the welding operations, but also from sides of the sleeve arranged obliquely in relation thereto, or, in the case of a rectangular cross section, the electron beam penetrates into the workpieces from the surfaces of all four sides of the sleeve at the same time or in succession The shaft cross sections or bar cross sections of the workpieces to be joined can be round, oval, triangular, square, rectangular, hexagonal or polygonal in some other way. Similarly, undercuts or concave contours are possible. In principle, any desired bar profile can be joined by means of the method according to the invention.

BRIEF DESCRIPTION OF THE DRAWINGS

The invention is described in more detail hereinbelow on the basis of a specific exemplary embodiment with reference to drawings, in which:

FIGS. 1-3 each show a cross section through a bar according to the invention with a sleeve according to the invention at a joining point between two bars for illustrating the method according to the invention, FIG. 4 shows a longitudinal section through an arrangement of two bars and a sleeve and also an electron beam welding apparatus.

DETAILED DESCRIPTION OF INVENTION

FIG. 4 shows a longitudinal section through a sleeve SL according to the invention, which is arranged around a joining point between two bars abutting bluntly against one another end-on, a first bar B1 and a second bar B2. Between the two bars B1, B2, there is a very narrow joint SG with dimensions in the region of unavoidable inaccuracy. The very narrow joint SG is reduced in regions of the end-face contact between the bars B1, B2 to a width of down to 0. The two bars B1, B2 extend along a common longitudinal axis X and are oriented coaxially in relation to one another. An electron beam welding apparatus EBA is arranged radially in relation to the longitudinal axis X, and radially emits an electron beam EB onto the region of the narrow joint SG and in this way joins the two bars B1, B2 at this welding point WP with the melt. FIGS. 1 to 3 each show different diameters D of the bars B1, B2 and different embodiments of the welding method according to the invention which are associated therewith. In the illustration shown in FIG. 1, the diameter D of the bars B1, B2 is smaller than the maximum weld penetration depth WD of the electron beam EB along a first progress direction PD1 of the electron beam welding apparatus EBA. What is decisive for the selection of the welding method according to the invention is the maximum thickness T of a thickness profile DT, illustrated in for example FIG. 1, of the cross section of the bars B1, B2 along a first progress direction PD1, or further progress directions PD1, PD2, PD3, PD4 in the region of the welding point WP in FIGS. 2 and 3. If the cross section is circular, as shown in FIGS. 1 to 3, the maximum thickness T is equal to the diameter D of the bars B1, B2.

In a first step of the method according to the invention, the two bars B1, B2 are oriented in relation to one another along a longitudinal axis X. Then, the two-part sleeve SL is placed around the joining point or welding point WP of the bars B1, B2, such that the sleeve SL surrounds the welding point WP in the circumferential direction with respect to the longitudinal axis X. Then, the electron beam welding shown in FIGS. 1 to 3 is effected along the surface SF of the sleeve SL by means of an electron beam welding apparatus EBA which moves along a progress direction PD1-PD4. Instead of moving the electron beam welding apparatus EBA along the surface SF of the sleeve SL, it is also possible within the context of the invention that the component to be joined itself (bars B1, B2) moves in relation to the electron beam EB. What is decisive here is merely the relative movement between the component to be joined and the electron beam welding apparatus EBA. Finally, the sleeve SL is removed from the bars B1, B2 by means of a mechanical cutting method, for example by turning or milling.

The sleeve has a rectangular outer cross section and has a part join TF, which is arranged in such a manner that the sleeve SL can be placed around the bars B1, B2. FIG. 1 shows the case in which the weld penetration depth WD of the electron beam EB is greater than the diameter D or the maximum thickness T of the bars B1, B2 along the thickness profile DT along the first progress direction PD1. Accordingly, passage through the arrangement of the two bars B1, B2 and the sleeve SL once is sufficient in order to join the bars completely to one another by the welding. In small quantities, the material of the sleeve SL, which is identical to the material of the two bars B1, B2, can serve as a filler for filling imperfections in the region of the weld seam.

FIG. 2 shows a case in which the maximum penetration depth WD of the electron beam EB is smaller than the maximum thickness T of the bars B1, B2 along the first progress direction PD1 but greater than half this maximum thickness T or the diameter D, because it involves a circular cross section. Accordingly, the workpiece is welded with the electron beam EB in two steps in the manner shown in FIG. 2. In a first step, the electron beam welding apparatus EBA moves (or the component moves under an electron beam EB) along a first progress direction PD1 along the welding point WP and the surface SF of the sleeve SL, and in a second step the electron beam welding apparatus EBA moves (or the component moves under an electron beam EB) in an antiparallel, second progress direction PD2 on the opposite side of the rectangular sleeve SL likewise parallel to the surface SF, such that there is an overlap between the first welding pass and the second welding pass.

In the exemplary embodiment shown in FIG. 3, the maximum thickness T or the diameter D of the round bars B1, B2 is more than twice as large as the maximum weld penetration depth WD of the electron beam EB, and accordingly welding is effected in four steps, the steps differing in each case by virtue of their different progress direction PD1-PD4 of the electron beam welding apparatus EBA and the different orientation of the electron beam EB in the plane of the welding point WP. In the specific example shown in FIG. 3, there are four progress directions which are oriented perpendicularly to one another and which are each oriented parallel to in each case a planar surface portion of the sleeve SL.

The invention claimed is:

1. A method for joining a first bar end-on to a second bar by means of electron beam welding at a welding point, comprising:
orienting the two bars in relation to one another along a longitudinal axis;
applying a sleeve, which surrounds the welding point in the circumferential direction with respect to the longitudinal axis;
welding at the welding point by means of electron beam welding, wherein an electron beam welding apparatus is moved and guided with an electron beam along a progress direction, relative to a surface of the sleeve and along the welding point, wherein the electron beam is guided in such a manner that a region in which the electron beam is introduced and a region in which it is removed are arranged outside the material which is actually to be joined of the first bar and of the second bar; and
removing the sleeve.

2. The method as claimed in claim 1,
wherein the sleeve is matched to an outer contour of the bars in the region of the welding point.

3. The method as claimed in claim 1, wherein the sleeve includes a rectangular outer contour.

4. The method as claimed in claim 1, wherein the sleeve is removed by cutting.

5. The method as claimed in claim 1, wherein the maximum projected weld penetration depth of the electron beam perpendicular to a first progress direction of an electron beam welding apparatus along the welding point is greater than the greatest thickness of the bars in the region of the welding point along a thickness profile along the first progress direction of the electron beam welding apparatus, and the electron beam welding apparatus passes into the material of the sleeve at a first end and emerges from the material of the sleeve at a second end along the first progress direction with the electron beam.

6. The method as claimed in claim 1,
wherein the maximum weld penetration depth of the electron beam perpendicular to a first progress direction of an electron beam welding apparatus along the welding point is smaller than the greatest thickness of the bars along a thickness profile of the first progress direction of the electron beam welding apparatus, and the electron beam passes into the material of the sleeve at a first end and emerges from the material of the sleeve at a second end, wherein the electron beam welding apparatus is guided along a second progress direction relative to the surface on the opposite side of the sleeve at the welding point, in such a manner that the electron beam passes into the material of the sleeve at a third end and emerges from the material of the sleeve at a fourth end.

7. The method as claimed in claim 6,
wherein the first progress direction is parallel to the second progress direction.

8. The method as claimed in claim 6, wherein the first progress direction is antiparallel to the second progress direction.

9. The method as claimed in claim 6, wherein the electron beam welding apparatus is guided over the surface from a plurality of planar sides of the sleeve along the welding point along various progress directions relative to the surface, in such a manner that the electron beam passes into the material of the sleeve at one end and emerges from the material of the sleeve at another end.

* * * * *